March 6, 1934.  L. R. YEAGER  1,950,096
METHOD AND APPARATUS FOR COATING ARTICLES
Filed June 18, 1929   2 Sheets-Sheet 1

Inventor
Leo R. Yeager

March 6, 1934. L. R. YEAGER 1,950,096
METHOD AND APPARATUS FOR COATING ARTICLES
Filed June 18, 1929 2 Sheets-Sheet 2
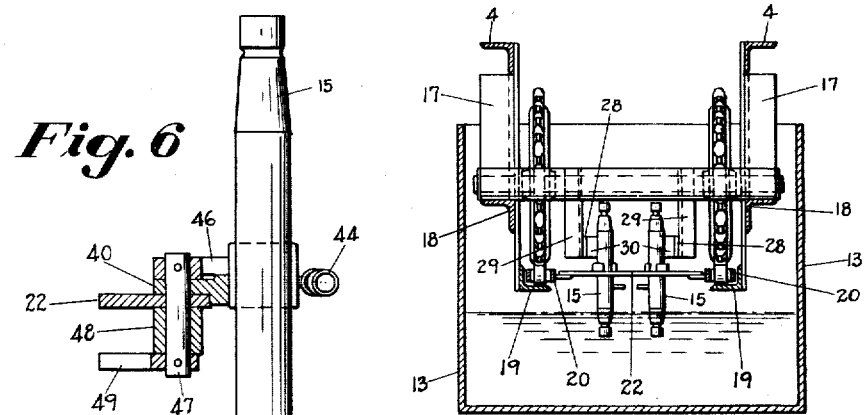
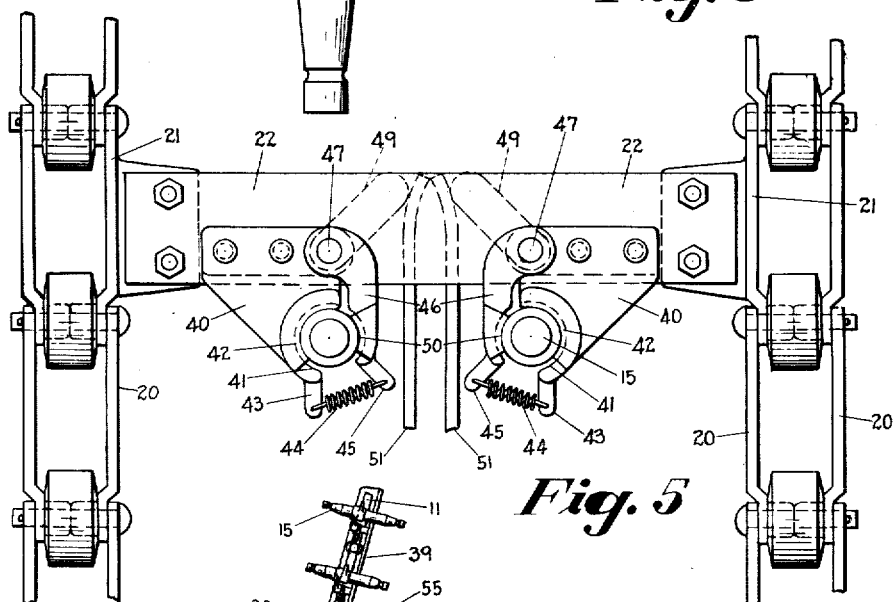
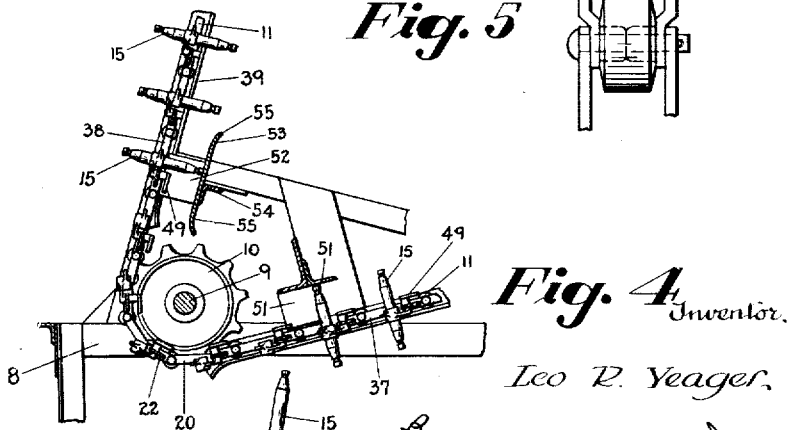

Patented Mar. 6, 1934

1,950,096

UNITED STATES PATENT OFFICE

1,950,096

METHOD AND APPARATUS FOR COATING ARTICLES

Leo R. Yeager, Columbus, Ohio, assignor to The Jeffrey Manufacturing Company, Columbus, Ohio, a corporation of Ohio Application June 18, 1929, Serial No. 371,899

17 Claims. (Cl. 204—5)

This invention relates to a method and apparatus for coating predetermined portions of articles to prevent such portions from being affected by subsequent heat treatment. Steel objects such as, for example, pitman arm shafts, which in the present illustration are corrugated and threaded at each end, have heretofore been dipped or immersed in a copper cyanide solution by hand to copper plate the ends of such shafts, but this hand process formerly used is very dangerous to the operator as the solution used for plating attacks the skin, causing eruptions. Moreover, it is a very slow process since each piece must be handled several times. Furthermore, a superior plating is effected which can be obtained by passing a small voltage of electric current through the objects and, consequently, the hand operations such as followed in the past can not be successfully employed.

Accordingly, the primary object of this invention is to provide a machine for coating predetermined portions of objects without requiring the operator to handle the object after placing it in the machine and before any coating has been applied to the object, and eliminates the uncertainty of not coating the required portions of the objects incident to the hand process.

Another important object of the invention is to provide a machine in which both ends of the object are coated or plated by one handling, thereby resulting in increased production.

A further object of the invention is to provide a machine which may be used to electroplate objects heretofore plated by hand, in order to obtain a more effective plating.

A still further object of the invention is to provide means for moving the objects after immersion in a direction to prevent the coating material from running on to portions of the object not designed to be coated, while allowing them to drain surplus coating and thereafter moving these articles in a direction to dry and invert them so that other predetermined portions thereof may be similarly coated.

Still another object of the invention is to provide a conveying instrumentality designed for the special shape of the objects to be treated in order to cause the objects cooperation in the electro-plating process, as well as to effect an extraordinarily simple means for associating the objects with the conveying means and for effecting their discharge therefrom.

Another object of the invention is to provide a simplified form of means for inverting the conveying means, whereby opposite ends of an object may be coated while in continuous transit and for effecting a partial drying of the objects prior to their discharge from the machine.

Still another object of the invention resides in the provision of simple and expeditious means for associating objects with the conveying means in such manner that opposite ends of the objects can be coated without changing their positions relative to the conveying means during their continuous movement through the machine.

Other objects and advantages of the invention will become apparent during the course of the following description.

In the accompanying drawings, wherein like numerals are employed to designate like parts throughout the several views:

Figure 3 is a transverse section of the same taken on the line 3—3 of Figure 2.

Figure 4 is an enlarged detail view illustrating the loading and unloading section of the machine.

Figure 5 is an enlarged plan of a fragment of the conveying means and work holding instrumentalities, and Figure 6 is an enlarged vertical section of the work holding means.

Figure 1:
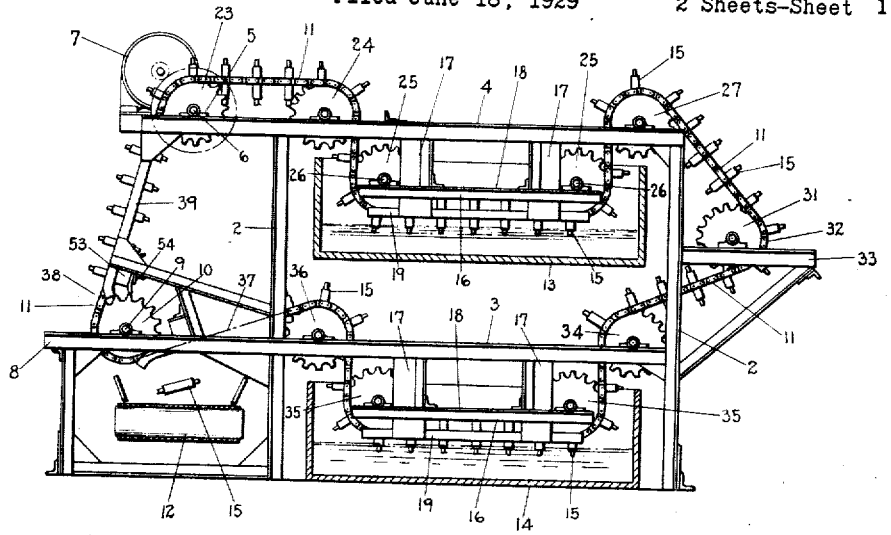
Figure 1 is a side elevation of the machine with immersion tanks shown in section.
Figure 2:
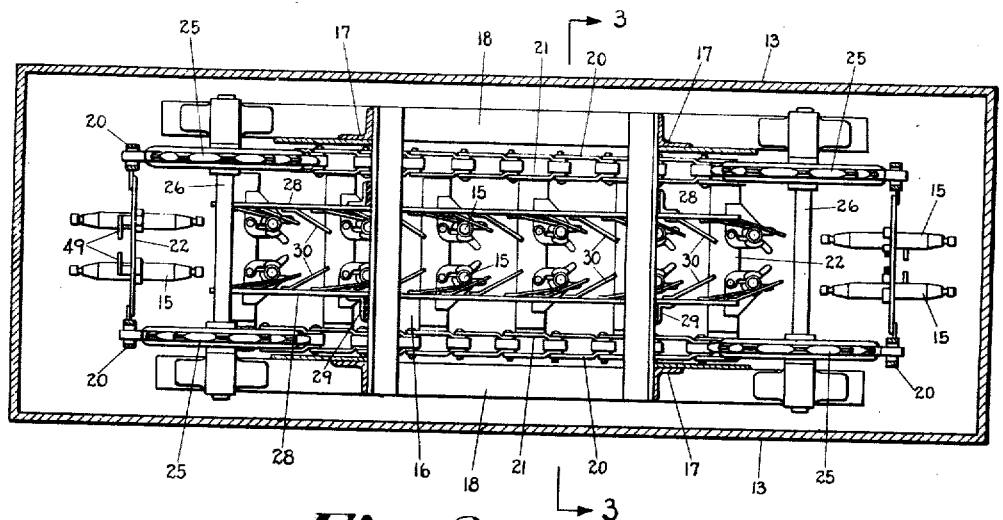
Figure 2 is a longitudinal horizontal section through the upper tank.

Referring now more particularly to the drawings, the numeral 1 designates the frame of the machine, consisting primarily of suitable metallic uprights 2 for supporting horizontal vertically spaced side bars 3 and 4, the latter being extended to provide bearings 5 for the main drive shaft 6 rotated by a motor 7 suitably supported upon the frame. The lower bars 3 are extended as at 8 to form the support of an idler shaft 9, upon which is mounted a pair of idler sprockets 10 to form a bight in an endless conveyor 11 trained around the sprockets 10 for a purpose which will be more fully explained hereinafter.

This end of the machine adjacent the sprockets 10 constitutes the loading and unloading section of the machine and beneath the extended portion 8 of the beams 3, an endless conveyor 12 of any desired type may be installed for catching the articles as they are discharged from the machine and for conveying them to desired points. Objects to be coated by the machine may be transported to the loading end of the machine by any suitable means, such as an endless conveyor or the like in order that the operator will have an inexhaustible supply of objects to feed to the machine to maintain constant production.

An immersion tank 13 containing a liquid coating composition or an electrolyte, such as copper cyanide solution, in case the articles are to be electro-plated, is suitably supported upon the frame between the uprights 2 and below the cross beams 4. Whether or not the tank is insulated from the metallic frame, depends upon how it is desired to conduct the current through the machine. A second immersion tank 14 of the same type is positioned beneath the cross bars 3 between the uprights 2. Two tanks are thus provided to effect the coating of opposite ends of the objects, here shown as pitman arm shafts 15, which are in the form of short stub shafts or pins having both ends reduced and screw threaded.

Suspended in each tank is a conductor frame 16 which is preferably, but not necessarily, insulated from the main frame 1. The frame for the upper tank is suspended by braces 17 from the top rail 4 of the main frame, and includes a pair of parallel spaced angle bars 18 from which are suspended a pair of spaced parallel horizontal angle bars 19 forming a runway or track. The frame 16 for the lower tank 14 is similarly suspended from the lower bar 3, and is similarly equipped with a depending trackway 19 which is, in both instances, spaced a suitable distance above the level of the liquid in the tank.

The endless conveyor 11 consists of a pair of spaced parallel flexible draft elements in the form of roller chains 20 having equally spaced attachment links 21, to which are fixed transversely extending cross-bars 22 constituting carriers for the work holders. These chains are trained over drive sprockets 23 secured to the drive shaft 6 to extend horizontally above the upper bars 4 to be trained over a pair of idler sprockets 24 mounted on the beams 4 above one end of the immersion tank 13 from whence the chains are directed downwardly into the tank 13 to be trained beneath spaced pairs of idler sprockets 25 secured to shafts 26 mounted in bearings at the ends of the angle bars 18, constituting a part of the suspended frame 16. This arrangement causes the conveyor chains to move horizontally on the trackways 19 longitudinally through the tank, it being noted that the rollers of the conveyor chains roll upon these trackways and sustain the weight of the conveyor chain, and objects being transported thereby to cause the lower ends of the objects 15 to be immersed.

From this initial immersion tank 13, the conveyor chains are directed vertically and over idler sprockets 27 mounted upon the angle bars 4 above the opposite end of the tank. This arrangement causes the objects being plated to move vertically after coming from the bath, so that they effectively drain back into the tank, surplus coating material and prevent this material from running on to portions of the objects which are not to be plated or coated. As will be more specifically described hereinafter, the objects 15 to be coated are held perpendicular to the conveyor with opposite ends projecting equal distances on opposite sides of the conveyor chain so that only one end of each sprocket is immersed and coated in the initial tank 13.

If it is wished to energize the objects during their immersion to effect an electro-plating, one way as illustrated, involves a pair of spaced parallel conductor bars 28 suspended in each immersion tank in the path of movement of the objects 15 carried by the conveyor chains. These two bars are suspended by brackets 29 insulated from the frame 16, and are suitably charged with a low voltage current. To the inner sides of the conductor bars 28 are suitably secured inclined flexible contact plates 30, arranged in overlapping series so that the objects to be plated are caused to brush against and flex these contacts, and will always be in contact with at least one of the series during its entire movement from one end of the tank to the other.

After the conveyor chains leave the idler sprockets 27, they are trained about idler sprockets 31 to form a bight 32 and to invert the conveyor chains, so that the opposite or uncoated ends of the objects will be immersed in the lower tank 14. These sprockets 31 are mounted upon a shaft journalled in an extension 33 of the main frame so as to elongate the stretches of the bight 32 and provide for a slightly extended travel of the objects through the air to assist in completely drying them prior to their secondary immersion when they are inverted from their position maintained in passing through the initial immersion tank 13.

After passing the sprockets 31, the conveyor chains are led inwardly of the machine and over a pair of idler sprockets 34 mounted upon a shaft sustained in bearings at one end of the horizontal bars 3 above one end of the secondary immersion tank 14. From this point, the conveyor chains are directed downwardly and beneath spaced pairs of idler sprockets 35 arranged at opposite ends of the suspended frame 16 within tank 14. Between these two sets of sprockets 35, the chains roll over the trackways 19, carying the upper ends of the objects 15 into successive engagement with overlapping resilient contacts 30 to energize the objects while having their opposite ends immersed and plated in the electrolyte.

After passing beneath the sprockets 35, the conveyor chains are directed vertically in the same manner that they leave the initial immersion tank 13, and are trained over idler sprockets 36 from where the chain is trained beneath the idler sprockets 10 to form the conveying means into a bight having a stretch 37 which is substantially horizontal and a stretch 38, which is approximately slightly inclined to the vertical. This stretch of conveyor 38, clearly shown in Figs. 1 and 4, moves upwardly through a trackway 39, which extends toward the sprockets 23 and guides the conveyor chains thereto.

The means for holding the work or objects to the conveyor chain during its circuitous travel, consists of a pair of automatically actuated holders carried by each carrier or cross-piece 22 of the conveyor. As all of the work holders are of the identical same construction, a description of one will suffice for all. Each holder comprises a stationary jaw 40 fixed to the carrier 22 at one edge to project thereover, where it is provided with an arcuate jaw face 41 lined, if desired, with resilient insulating material 42, such as rubber. This projecting portion of the stationary jaw is provided with an apertured lug 43, to which is secured one end of a tension spring 44, the other end thereof being attached to an apertured lug 45 projecting from a movable jaw 46, which is secured to the upper end of a pivot pin 47 extending through the stationary jaw and carrier 22 with its lower end disposed beneath the carrier and spaced a distance therebelow by a spacing sleeve 48 for the attachment of a trip lever 49. The movable jaw 46 is also provided with an arcuate jaw face which is lined, if desired, with a resilient insulating liner 50. The tension spring 44 normally urges the two jaws together into engagement with opposite sides of the object, and this normally urges the trip lever 49 toward the center of the carrier bar 22 to be disposed in the path of a double cam 51 mounted on the frame of the machine adjacent the stretch 37 which constitutes the discharge point of the machine. This double cam 51 is simply a pair of plates having their ends converging so as to meet at a point between the ends of the trip levers 49 of each pair of work holders so as to simultaneously engage both trips and simultaneously cause the release of two objects at a time from between the jaws. If desired, these plates may be so inclined as to cause a forced discharge of the objects from the work holders so they will fall upon the conveying mechanism 12 to be transported to the point desired, or into boxes which may be disposed beneath the sprockets 10 in place of the conveyor 12.

At the point just above the sprockets 10, which constitutes the loading point, a second double cam 52, similar to cam 51 is secured to the frame of the machine and, at the same point, the plate 53 is secured by the angle bars 54 to extend substantially parallel to the stretch 38 of the conveyor chains. The ends 55 of this plate are curved, as shown. The plate 53 is spaced such a distance from the conveyor chains and carriers 22 thereof, that the objects 15 when inserted end first between the work holding jaws, will abut this plate and cause opposite ends of the objects to be disposed so as to project equal distances from opposite sides of the carrier bars 22.

From the foregoing description, it will be obvious that an operator standing at the loading station, can rapidly insert the objects into the work holders as the jaws thereof are automatically opened at this point, and that the jaws of the work holders will automatically close as soon as they pass the cam plates 52 to firmly hold the work while transporting it through the machine. The lower ends of the objects projecting below the conveyor chain will be immersed in the coating material in the initial tank 13 to be coated, from whence they will be inverted by the conveyor chain in passing around the idler sprockets 31 so as to dispose the other ends of the objects in the material contained in the secondary tank 14 to obtain a coating of the opposite ends. From this secondary tank, the articles are conveyed down the stretch 37 where the jaws of the work holders are caused to automatically open to release the objects and drop them by gravity, due to the trip levers 49 of the movable jaws 46 coming into contact with the cam plates 51 as heretofore described. The particular disposition of the stretch 37 of the conveyor chain is important, in that the work holders maintain the shaft-like articles substantially perpendicular to the chain and when the movable jaws of the work holders open, the objects are permitted to fall by gravity from the discharge end of the machine. Likewise, the disposition of the stretch 38 of the conveyor chain at the loading station enables the operator to conveniently insert the objects into the work holders as they automatically open in going past the loading station, and locates the operator a substantial distance from the immersion tanks where fumes therefrom will not be obnoxious.

With the herein described apparatus, it is possible to plate or coat the articles in several different ways. First, it is possible with this apparatus to apply the plating to the articles without energizing them by simply immersing and passing them through a proper solution or liquid coating composition.

Second, it is possible to plate the articles by energizing them during their passage through a proper solution preferably in the form of an electrolyte and this may be accomplished in any one of the following three ways.

First, the machine may be constructed as shown in the drawings with the conductors 28 carrying the live current and insulated from the frame, and the articles insulated from the jaws of the holders so that current will pass from the conductor bars 28 through the articles and electrolyte from where it is grounded through the frame of the machine. In this instance, the immersion tanks would be electrically connected to the frame.

Another way is to electrically connect the conductor bars 28 to the frame to render the same a live conductor for the current. In this case, the articles would not be insulated from the jaws of the holders, but the immersion tanks would be insulated from the frame and the current passing through the solution would be grounded by means of a suitable conductor leading from the electrolyte.

A third way of electro-plating the articles would be to insulate the immersion tanks from the frame and to eliminate the insulation of the articles from the jaws of the holders so as to employ the conveyor chains and frame as a live current conductor of current to the articles and through the electrolyte. In this case, collector rings would be placed on one or more of the sprocket carrying shafts to introduce current to the frame and the electrolyte to have a ground connection for the return circuit of the current.

It is to be understood that various changes in the construction and arrangement of the various parts may be resorted to without departing from the scope of the appended claims, and that other objects or articles than those disclosed herein may be expeditiously handled by the machine.

I claim:

1. The method of coating articles consisting of successively moving the articles into engagement with a plurality of flexible charged contacts while said articles are being moved through an electrolyte.

2. In an apparatus of the class described, the combination of a frame, an immersion tank, an endless conveyor guided into said tank, article engaging means carried by the conveyor and movable in a plane substantially parallel to the conveyor to receive articles, and an article abutment member extending in approximately the same direction as the conveyor adjacent thereto for limiting the movement of said articles, whereby they are associated with said conveyor in a predetermined relation.

3. In an apparatus of the class described, the combination of a frame, an immersion tank, an endless conveyor guided into said tank, article engaging means carried by the conveyor and movable in a plane substantially parallel to the conveyor to receive articles, an article abutment member extending in approximately the same direction as the conveyor adjacent thereto for limiting the movement of said articles, whereby they are associated with said conveyor in a predetermined relation, and means adjacent said abutment member for actuating the article engaging means to move them into article receiving position.

4. In an apparatus of the class described, the combination of a frame, an immersion tank, an endless conveyor guided into said tank, article engaging means carried by said conveyor and movable to engage articles, a bight in said conveyor, means on one side of said bight for actuating the article engaging means to open the same to engage articles, and means on the other side of said bight for actuating the article engaging means to open the same to discharge articles.

5. In an apparatus of the class described, the combination of a frame, an immersion tank, an endless conveyor guided into said tank, article engaging means carried by said conveyor and movable to engage articles, a bight in said conveyor having a substantially horizontal discharge stretch and a substantially vertical loading stretch, means adjacent the loading stretch for opening the article engaging means to engage articles, and means adjacent the discharge stretch for opening the article engaging means to discharge articles.

6. In a device of the class described, a conveyor comprising a pair of endless draft elements, a carrier connecting said elements, article engaging means including stationary and movable jaws on said carrier and normally retained in closed position, said jaws extending over the edge of said carrier, said movable jaw being movable in a plane parallel to said carrier and cooperating with said stationary jaw to hold articles perpendicular to said draft element, whereby they can be released from the conveyor when the draft element is substantially horizontal, a trip associated with said movable jaw, and a cam means in the path of said trip for engagement therewith for causing the movable jaw to open.

7. A coating machine comprising an immersion tank adapted to contain an electrolyte, an article carrier movable into and through and out of said tank, and a charged conductor member arranged longitudinally of the tank for engagement with the articles as they are conveyed through the tank by said article carrier.

8. A coating machine comprising an immersion tank adapted to contain an electrolyte, an article carrier movable through said tank, a charged conductor member arranged longitudinally of the tank, and a plurality of flexible conductor elements carried by said member for successive contact with said articles as they are conveyed through the tank by said article carrier.

9. A coating machine comprising an immersion tank adapted to contain an electrolyte, a track in said tank above the level of the electrolyte, a conveyor movable downwardly into said tank at one end thereof and into position to be supported by said track and having article holding means for moving articles through the electrolyte with portions arranged above the level thereof, and a charged conductor member arranged longitudinally of the tank above the liquid level for engagement with the articles as they are moved through the tank by said conveyor, said conveyor being movable out of said tank at the opposite end thereof, whereby the plated article may be removed from said holding means at a station located exteriorly of said tank.

10. Article engaging means for use on a conveyor, said means comprising stationary and movable jaws, spring means connecting the entrance ends of said jaws to normally close the same, and a member operatively connected to said movable jaw for automatically opening said jaws upon contact with a stationary part adjacent said conveyor.

11. Article engaging means for use on the carrier member of a conveyor, said means comprising stationary and movable jaws, means for normally urging the jaws to a closed position, a pin extending through and journalled in said carrier member and secured to said movable jaw on one side of said carrier member, and a trip arm secured to said pin on the opposite side of the carrier member and disposed to contact a stationary cam adjacent said conveyor to open said jaws.

12. In a device of the class described, a conveyor, a carrier member carried thereby, article engaging means on opposite sides of the center of said member including stationary and movable jaws, means for normally urging said jaws to closed positions, said movable jaws having lateral trip arms projecting toward the center of said member, and cam means located at approximately the longitudinal center of said conveyor for engagement with said trip arms simultaneously.

13. In an apparatus of the class described, the combination of a frame, a pair of superposed tanks, supporting tracks and idler pulleys suspended from said frame and disposed in each tank, an endless conveyor mounted on said frame and traversing said tracks and said pulleys, and other idler pulleys carried by said frame outside of said tanks for inverting the endless conveyor and the articles carried thereby as they move from one tank to the other to cause immersion of predetermined portions of the articles in one tank and other predetermined portions of the articles in the other tank.

14. Article holding means for an endless conveyor having carriers associated therewith, said holding means comprising a fixed jaw secured to said carrier, a movable jaw pivoted to said carrier for movement in a plane substantially parallel to the plane of said carrier, resilient means urging said movable jaw toward said fixed jaw, and an operating member operatively associated with said movable jaw and movable in a plane substantially parallel to the plane of movement of said movable jaw for opening said jaws against the action of said resilient means.

15. Article holding means for an endless conveyor having carriers associated therewith, said holding means comprising a fixed jaw secured to said carrier, a movable jaw pivoted to said carrier for movement in a plane substantially parallel to the plane of said carrier, resilient means connecting the entrance ends of said jaws to normally close the same, and an operating member operatively associated with said movable jaw and movable in a plane substantially parallel to the plane of movement of said movable jaw for opening said jaws against the action of said resilient means.

16. Article holding means for an endless conveyor having carriers associated therewith, said holding means comprising a fixed jaw secured to said carrier and projecting longitudinally of the conveyor over an edge of said carrier, a movable jaw pivoted to said carrier and projecting over said edge of the carrier into operative relation to said fixed jaw, said jaws having their article engaging surfaces positioned on the projecting portions thereof, said surfaces being disposed substantially perpendicularly to the plane of the carrier whereby an article inserted in said jaws may be held thereby to project above and below the plane of the carrier, resilient means urging said jaws to closed position, and an operating member associated with said movable jaw for opening said jaws against the action of said resilient means.

17. Article holding means for an endless conveyor having carriers associated therewith, said holding means comprising a fixed jaw secured to said carrier and projecting longitudinally of the conveyor over an edge of said carrier, a movable jaw pivoted to said carrier and projecting into operative relation to said fixed jaw and movable in a plane substantially parallel to the plane of said carrier, resilient means urging said jaws to closed position, and an operating member associated with said movable jaw and movable in a plane parallel to the plane of movement of said movable jaw for opening said jaws against the action of said resilient means.

LEO R. YEAGER.

CERTIFICATE OF CORRECTION.

Patent No. 1,950,096.            March 6, 1934.

LEO R. YEAGER.

It is hereby certified that error appears in the printed specification of the above numbered patent requiring correction as follows: Page 2, line 68, for "sprocket" read object; and line 101, for "led" read lead; and that the said Letters Patent should be read with these corrections therein that the same may conform to the record of the case in the Patent Office.

Signed and sealed this 24th day of April, A. D. 1934.

Bryan M. Battey (Seal)            Acting Commissioner of Patents.

may be held thereby to project above and below the plane of the carrier, resilient means urging said jaws to closed position, and an operating member associated with said movable jaw for opening said jaws against the action of said resilient means.

17. Article holding means for an endless conveyor having carriers associated therewith, said holding means comprising a fixed jaw secured to said carrier and projecting longitudinally of the conveyor over an edge of said carrier, a movable jaw pivoted to said carrier and projecting into operative relation to said fixed jaw and movable in a plane substantially parallel to the plane of said carrier, resilient means urging said jaws to closed position, and an operating member associated with said movable jaw and movable in a plane parallel to the plane of movement of said movable jaw for opening said jaws against the action of said resilient means.

LEO R. YEAGER.

CERTIFICATE OF CORRECTION.

Patent No. 1,950,096.    March 6, 1934.

LEO R. YEAGER.

It is hereby certified that error appears in the printed specification of the above numbered patent requiring correction as follows: Page 2, line 68, for "sprocket" read object; and line 101, for "led" read lead; and that the said Letters Patent should be read with these corrections therein that the same may conform to the record of the case in the Patent Office.

Signed and sealed this 24th day of April, A. D. 1934.

Bryan M. Battey (Seal)    Acting Commissioner of Patents.